(12) United States Patent
Bae et al.

(10) Patent No.: US 12,486,010 B2
(45) Date of Patent: Dec. 2, 2025

(54) SEAWATER FLOW CONTROL DEVICE FOR UNIFORM MOTION

(71) Applicant: AGENCY FOR DEFENSE DEVELOPMENT, Daejeon (KR)

(72) Inventors: Seong-Hwan Bae, Daejeon (KR); Seok-Jin Oh, Daejeon (KR); Jun-Young Heo, Daejeon (KR); Ji-Su Yoon, Daejeon (KR); Seon-Uk Heo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 455 days.

(21) Appl. No.: 18/127,023

(22) Filed: Mar. 28, 2023

(65) Prior Publication Data
US 2023/0348032 A1    Nov. 2, 2023

(30) Foreign Application Priority Data
Apr. 1, 2022 (KR) .................. 10-2022-0040909

(51) Int. Cl.
*B63G 8/08* (2006.01)
(52) U.S. Cl.
CPC ............ *B63G 8/08* (2013.01); *Y02T 70/10* (2013.01)
(58) Field of Classification Search
CPC .. B63G 8/08; B63G 8/00; Y02T 70/10; Y10T 137/7785; F16H 21/16; F16H 19/04; F42B 19/12; G05D 16/107; G05D 16/0683; G05D 16/0655

USPC ..... 440/113; 137/484.4, 498, 505.13, 505.46
See application file for complete search history.

(56) References Cited

U.S. PATENT DOCUMENTS

| 2010/0051840 A1* | 3/2010 | Jung | F16K 3/265 |
| | | | 251/129.03 |
| 2015/0226337 A1* | 8/2015 | McHugh | E21B 34/025 |
| | | | 251/282 |

FOREIGN PATENT DOCUMENTS

| CN | 111256899 A | * | 6/2020 | ............. G01L 7/166 |
| KR | 10-0980612 B1 | | 9/2010 | |
| KR | 10-2151486 B1 | | 9/2020 | |

* cited by examiner

*Primary Examiner* — Peter M Poon
(74) *Attorney, Agent, or Firm* — LRK PATENT LAW FIRM

(57) ABSTRACT

The present invention relates to a seawater flow control device for a uniform motion, and more particularly, to a seawater flow control device for a uniform motion, which controls a velocity of a propulsion system by adjusting a combustion reaction between seawater and a propellant by adjusting a seawater flow rate depending on the number of operating seawater discharge holes. According to the present invention, it is possible to control the velocity of the propulsion system by increasing the amount of seawater when the velocity of the propulsion system is low and decreasing the amount of seawater when the velocity of the propulsion system is high, thereby implementing a uniform motion of the propulsion system.

8 Claims, 3 Drawing Sheets

- - ▶ SEAWATER
- - - - ▶ PRESSURE
──▶ MOVEMENT DIRECTION

- - ▶ SEAWATER
- - - - ▶ PRESSURE
──▶ MOVEMENT DIRECTION

- — · — ·▶ SEAWATER
- ········▶ PRESSURE
- ──────▶ MOVEMENT DIRECTION

- — · — ·▶ SEAWATER
- ········▶ PRESSURE
- ──────▶ MOVEMENT DIRECTION

SEAWATER FLOW CONTROL DEVICE FOR UNIFORM MOTION

CROSS REFERENCE TO RELATED APPLICATION

The present application claims priority to Korean Patent Application No. 10-2022-0040909, filed on Apr. 1, 2022, the entire contents of which is incorporated herein for all purposes by this reference.

BACKGROUND OF THE INVENTION

1. Field of the Invention

The present invention relates to a seawater flow control device for a uniform motion, and more particularly, to a seawater flow control device for a uniform motion, which controls a velocity of a propulsion system by adjusting a combustion reaction between seawater and a propellant by adjusting a seawater flow rate depending on the number of operating seawater discharge holes.

2. Description of Related Art

In general, cavitation, in which a fluid is vaporized, occurs when a velocity of an underwater vehicle increases, and local pressure at the periphery of an object becomes lower than vapor pressure of the fluid. In this case, when a movement velocity further increases, the cavitation grows to the extent that the cavitation covers the entire shape of the underwater vehicle. This situation is called supercavitation.

The underwater vehicle, which is covered by the supercavitation while moving under the water, is affected as if the underwater vehicle moves in the air, and thus a drag force applied to the object is dramatically reduced. The underwater vehicle, which greatly reduces the drag force by using the supercavitation while moving under the water, is called a 'supercavitation underwater vehicle'.

However, a method using electricity or thermal energy, like a method used for the currently used torpedo, hardly generates supercavitation, and a solid rocket propulsion system in the related art may exhibit a corresponding velocity. However, because the solid rocket propulsion system includes an oxidant of 70% or more, which increases the weight and volume and restricts a long-distance traveling.

To solve the above-mentioned problem, a seawater intake propulsion system has been proposed as a rocket propulsion system. The seawater intake propulsion system uses introduced seawater as the oxidant by using the fact that the underwater vehicle moves under the water, and the seawater intake propulsion system combusts metal fuel that may easily react with the seawater and produce high energy.

In general, the seawater intake rocket propulsion system refers to a rocket propulsion system that may suck outside seawater and substitute the seawater for an oxidant contained in a propellant for a rocket, thereby greatly increasing thrust (specific impulse) with respect to the amount of propellant of the propulsion system. In case that the seawater intake rocket propulsion system is used, the increased thrust performance may greatly increase an underwater traveling distance in comparison with a general rocket propulsion system.

FIG. 1 is a view briefly illustrating a combustion system of a supercavitation seawater intake propulsion system. Referring to FIG. 1, the supercavitation seawater intake propulsion system sucks seawater through a pipe of a cavitator 1 positioned at a rear portion of the supercavitation seawater intake propulsion system while an underwater vehicle moves under the water. Further, the sucked seawater moves to an injector 4 along a seawater intake pipe 2, and the seawater injected from the injector 4 is used as an oxidant and generates a combustion reaction with a propellant 6, thereby generating power of the propulsion system.

In addition, to prevent a situation in which a distance between a reaction surface of the propellant 6 and the injector 4 increases as the propellant 6 is combusted and consumed, the sucked seawater pushes a piston 5 positioned at an opposite side to the reaction surface of the propellant 6, thereby maintaining a constant distance between the propellant 6 and the injector 4.

However, the pressure of the seawater decreases when a velocity of the propulsion system is low, and the pressure of the seawater increases when the velocity of the propulsion system is high. Therefore, in case that the velocity of the propulsion system is low, a small amount of power is generated as the propellant small in amount generates the combustion reaction with the seawater because of the low pressure of the seawater. On the contrary, in case that the velocity of the propulsion system is high, a large amount of power is generated as the propellant relatively large in amount generates the combustion reaction with the seawater because of the high pressure of the seawater.

Therefore, there occurs a problem in that the velocity of the propulsion system varies because of the pressure difference of the seawater caused by the change in velocity of the propulsion system.

SUMMARY OF THE INVENTION

The present invention is proposed to solve these problems and aims to control a seawater flow rate by using a pressure difference of seawater in accordance with a velocity of a propulsion system and thus control the velocity of the propulsion system by adjusting a combustion rate.

To achieve the above-mentioned technical object, a seawater flow control device for a uniform motion according to the present invention may include: a seawater intake pipe; a plurality of seawater discharge holes formed through the seawater intake pipe so that seawater is discharged through the plurality of seawater discharge holes; a piston connected to an end of the seawater intake pipe by means of an elastic member; and an outer cover connected to the piston and configured to open or close the seawater discharge holes. The elastic member may be an elastic spring.

The seawater intake pipe may include a first intake pipe and a second intake pipe, and a diameter of the first intake pipe may be smaller than a diameter of the second intake pipe.

The seawater discharge holes may be formed through the first intake pipe, and the piston may be connected to an end of the first intake pipe by means of the elastic member.

In this case, the piston is moved, in a direction in which the elastic member is compressed, by the pressure of the seawater sucked into the seawater intake pipe. Therefore, the outer cover moves in a direction in which the seawater discharge holes are closed, i.e., a direction opposite to the movement direction of the piston, such that a seawater flow rate is adjusted as some of the seawater discharge holes are closed.

That is, when the piston is moved by the pressure of the seawater, the outer cover opens or closes the seawater discharge holes to adjust the seawater flow rate.

In addition, the seawater flow control device for a uniform motion according to the present invention may further include a piston rod connected to one side of the piston and having a rack gear formed at an end thereof, and a gear configured to engage with the rack gear.

The gear may be connected to the outer cover, the piston and the piston rod may be rectilinearly moved by the pressure of the seawater, and the gear may be rotated by the rectilinear motion of the piston rod, such that the outer cover may move.

The seawater flow control device for a uniform motion according to the present invention may further include: a first link having one side fixedly connected to the gear; a second link having one side coupled to the other side of the first link; and a third link having one side coupled to the other side of the second link. In this case, the other side of the third link is connected to the outer cover.

More specifically, the other side of the first link and one side of the second link may be hingedly coupled to each other.

The seawater flow control device for a uniform motion according to the present invention may further include an inner blocking part provided in the first intake pipe or an outer blocking part provided on a surface of the first intake pipe.

The inner blocking part may prevent the piston from moving toward a front end of the first intake pipe, and the outer blocking part may prevent the outer cover from moving toward a front end of the first intake pipe.

BRIEF DESCRIPTION OF THE DRAWINGS

FIGS. 4A and 4B are views illustrating an embodiment of the seawater flow control device for a uniform motion according to the present invention, in which FIG. 4A is a view illustrating an embodiment in case that pressure of seawater is low, and FIG. 4B is a view illustrating an embodiment in case that pressure of seawater is high.

DETAILED DESCRIPTION OF THE INVENTION

Figure 1A:
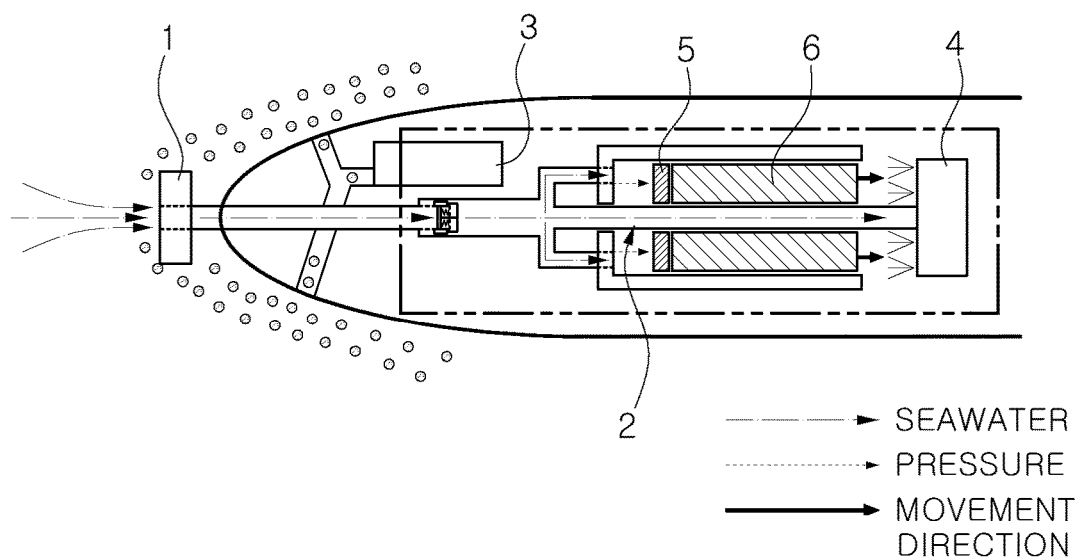
FIG. 1A is a view illustrating a combustion system of a supercavitation seawater intake propulsion system.
Figure 1B:
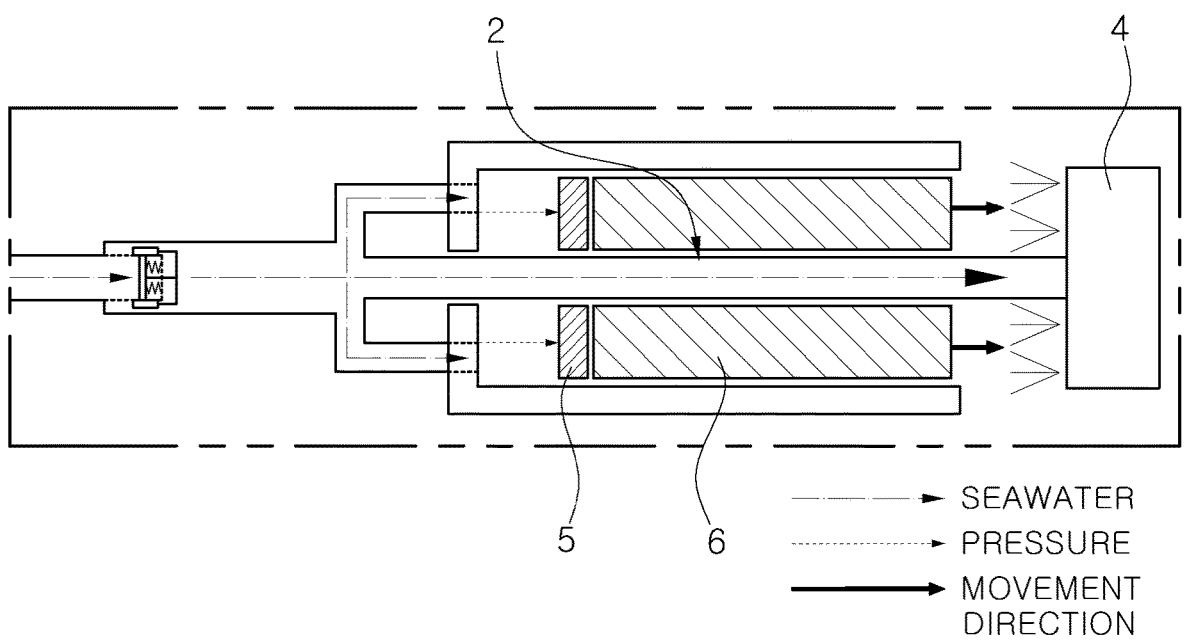
FIG. 1B is an enlarged view of an interior of the combustion system of the propulsion system.

The present invention may be variously modified and may have various embodiments, and particular embodiments illustrated in the drawings will be specifically described below. However, the description of the exemplary embodiments is not intended to limit the present invention to the particular exemplary embodiments, but it should be understood that the present invention is to cover all modifications, equivalents and alternatives falling within the spirit and technical scope of the present invention.

The terms including ordinal numbers such as "first," "second," and the like may be used to describe various constituent elements, but the constituent elements are not limited by the terms.

These terms are used only to distinguish one constituent element from another constituent element.

Hereinafter, a seawater flow control device for a uniform motion according to an embodiment of the present invention will be described in detail with reference to the accompanying drawings.

Figure 2:
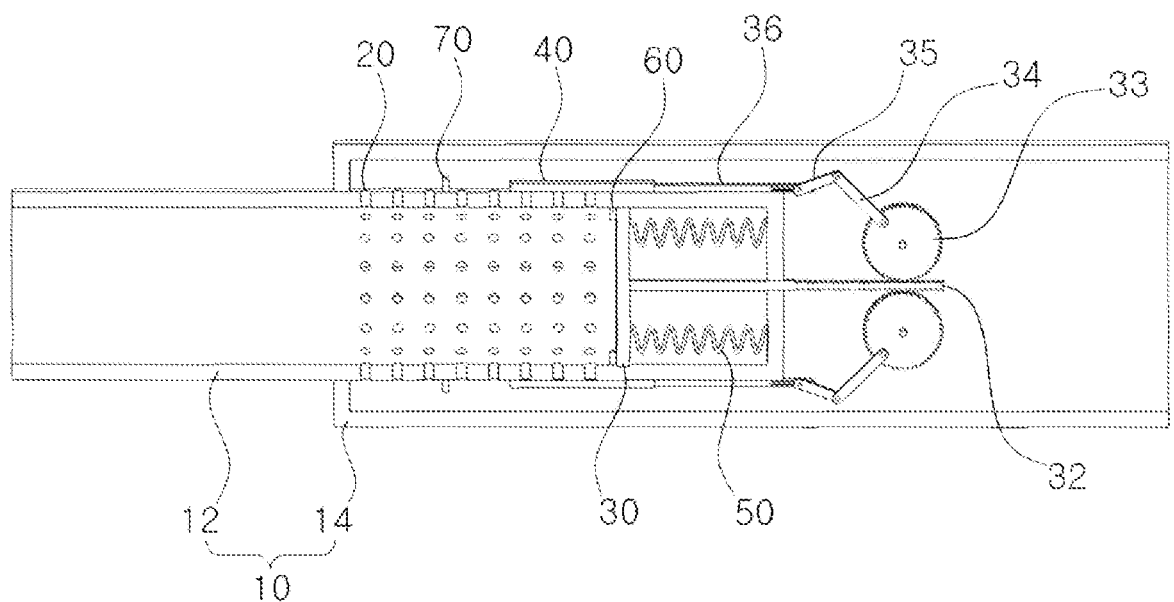
FIG. 2 is a cross-sectional view illustrating a seawater flow control device for a uniform motion according to the present invention.

FIG. 2 is a cross-sectional view illustrating the seawater flow control device for a uniform motion according to the present invention.

Figure 3:
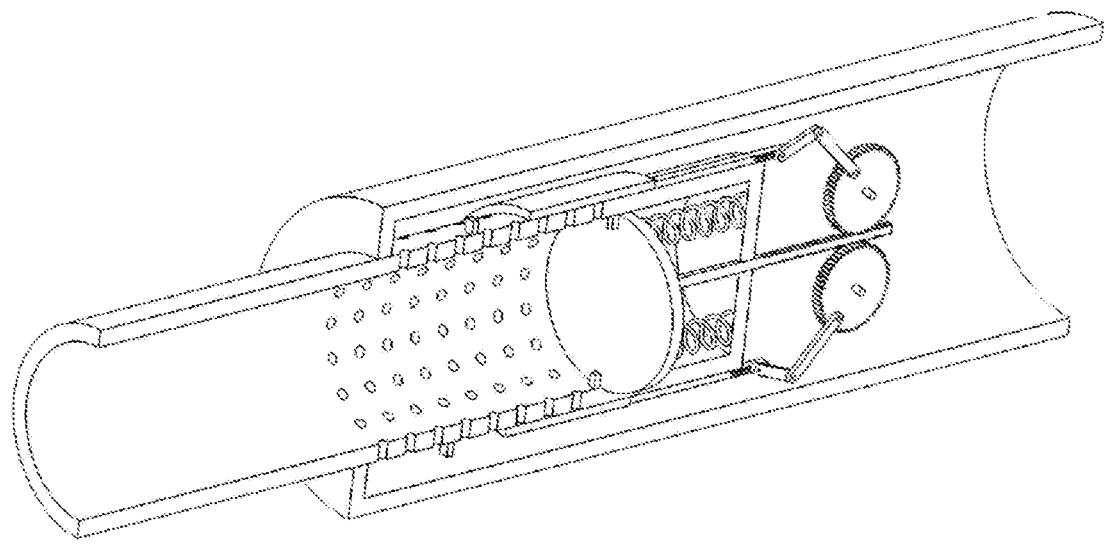
FIG. 3 is a stereoscopic view illustrating the seawater flow control device for a uniform motion according to the present invention.

FIG. 3 is a stereoscopic view illustrating the seawater flow control device for a uniform motion according to the present invention.

As illustrated in FIGS. 2 and 3, the seawater flow control device for a uniform motion according to the embodiment of the present invention may include: a seawater intake pipe 10; seawater discharge holes 20 formed through the seawater intake pipe 10 so that seawater may be discharged through the seawater discharge holes 20; a piston 30 connected to an end of the seawater intake pipe 10 by means of an elastic member 50; and an outer cover 40 connected to the piston 30 and configured to open or close the seawater discharge holes 20.

The seawater intake pipe 10 includes a first intake pipe 12 and a second intake pipe 14. A diameter of the first intake pipe 12 is smaller than a diameter of the second intake pipe 14.

More specifically, the seawater discharge holes 20 are formed through the first intake pipe 12. The piston 30 may be connected to the end of the first intake pipe 12 by means of the elastic member 50. In this case, the elastic member 50 may be an elastic spring.

In this case, the piston 30 is moved, in a direction in which the elastic member 50 is compressed, by the pressure of the seawater sucked into the seawater intake pipe 10. Therefore, the outer cover 40 moves in a direction in which the seawater discharge holes 20 are closed, i.e., a direction opposite to the movement direction of the piston 30, such that a seawater flow rate is adjusted as some of the seawater discharge holes 20 are closed.

That is, when the piston 30 is moved by the pressure of the seawater, the outer cover 40 opens or closes the seawater discharge holes 20 to adjust the seawater flow rate.

In addition, the seawater flow control device for a uniform motion according to the embodiment of the present invention may further include a piston rod 32 connected to one side of the piston 30 and having a rack gear formed at an end thereof, and gears 33 configured to engage with the rack gear. In this case, the gear 33 is connected to the outer cover 40.

Therefore, the piston 30 and the piston rod 32 may be rectilinearly moved by the pressure of the seawater, and the gear 33 may be rotated by the rectilinear motion of the piston rod 32. As a result, the outer cover may be rectilinearly moved by the rotational motion of the gear 33.

In addition, the seawater flow control device for a uniform motion according to the present invention may further include: a first link 34 having one side fixedly connected to the gear 33; a second link 35 having one side coupled to the other side of the first link 34; and a third link 36 having one side coupled to the other side of the second link 35. In this case, the other side of the third link 36 is connected to the outer cover 40.

More specifically, the other side of the first link 34 and one side of the second link 35 may be hingedly coupled to each other.

Therefore, when the gear 33 rotates, the first link 34 fixedly coupled to the gear 33 also moves. As a result, the third link 36 may be rectilinearly moved by the rotational motion of the gear 33 by means of the coupling relationship between the first link 34 and the second link 35. That is, the outer cover 40 connected to the third link 36 may be rectilinearly moved, and the outer cover 40 may or may not block the seawater discharge hole 20, thereby adjusting the seawater flow rate.

Figure 4A:
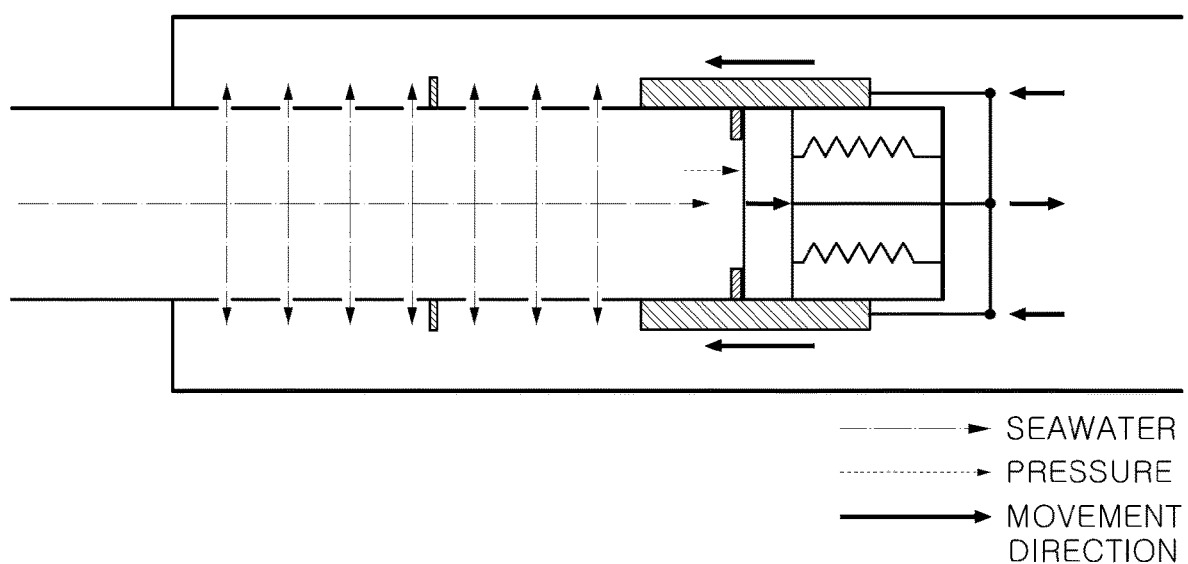
Figure 4B:
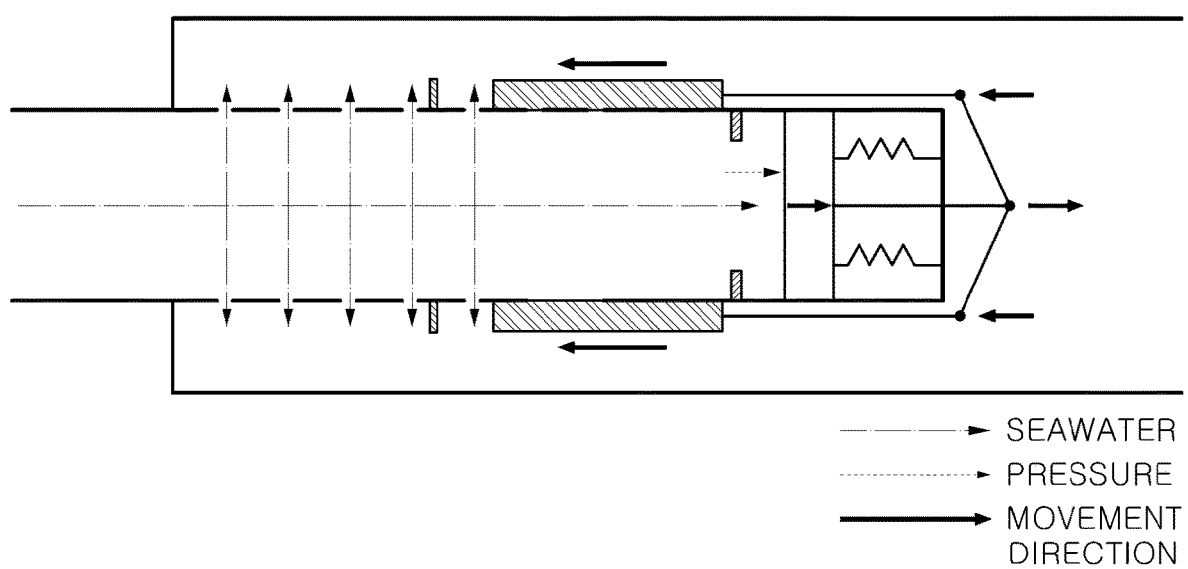

FIGS. 4A and 4B illustrate an embodiment of the seawater flow control device for a uniform motion according to the present invention.

FIG. 4A illustrating an embodiment of the seawater flow control device for a uniform motion according to the embodiment of the present invention in case that the pressure of the seawater is low.

Referring to FIG. 4A, the pressure of the seawater in the seawater intake pipe varies depending on a velocity of the propulsion system. In case that the velocity of the propulsion system is low, the pressure of the seawater in the seawater intake pipe is low, and the low pressure makes the seawater unable to move the piston 30 much in the direction in which the elastic member 50 is compressed. As a result, the outer cover 40 connected to the piston 30 cannot be moved much in the direction in which the seawater discharge hole 20 is closed.

Therefore, because the outer cover 40 cannot close a large number of the plurality of seawater discharge holes 20, the seawater sucked into the seawater intake pipe 10 may be discharged through the plurality of seawater discharge holes 20 that is not closed by the outer cover 40. As a result, the amount of seawater, which reaches an injector (not illustrated), increases.

As a result, because the amount of seawater, which reaches the injector, increases, the seawater may generate an active combustion reaction with the propellant and thus generate a larger amount of power of the propulsion system. As a result, the velocity of the propulsion system may increase.

In addition, as illustrated in FIG. 4A, the seawater flow control device for a uniform motion according to the embodiment of the present invention may further include an inner blocking part 60 provided in the first intake pipe 12.

The inner blocking part 60 may prevent the piston 30 from moving toward a front end of the first intake pipe 12. Therefore, even though the pressure of the seawater applied to the piston 30 is very low, it is possible to restrict a position of the piston 30 so that the piston 30 cannot move a predetermined distance or more toward the front end of the first intake pipe 12.

FIG. 4B illustrating an embodiment of the seawater flow control device for a uniform motion according to the embodiment of the present invention in case that the pressure of the seawater is high.

Referring to FIG. 4B, in case that the velocity of the propulsion system is high, the pressure of the seawater in the seawater intake pipe is high, and the high pressure enables the seawater to move the piston 30 much in the direction in which the elastic member 50 is compressed. As a result, the outer cover 40 connected to the piston may move much in the direction in which the seawater discharge hole 20 is closed.

Therefore, because the outer cover 40 may close a large number of the plurality of seawater discharge holes 20, the seawater sucked into the seawater intake pipe 10 may be discharged through a small number of the seawater discharge holes 20 that are not closed by the outer cover 40. As a result, the amount of seawater, which reaches the injector (not illustrated), decreases.

As a result, because the amount of seawater, which reaches the injector, decreases, the seawater may generate a relatively small amount of power of the propulsion system through the combustion reaction with the propellant. As a result, the velocity of the propulsion system may be controlled to a desired velocity.

In addition, as illustrated in FIG. 4B, the seawater flow control device for a uniform motion according to the embodiment of the present invention may further include an outer blocking part 70 provided on a surface of the first intake pipe 12.

The outer blocking part 70 may prevent the outer cover 40 from moving toward the front end of the first intake pipe 12. Therefore, it is possible to restrict the movement distance of the outer cover 40 so that the outer cover 40 cannot close all the seawater discharge holes 20 even though the pressure of the seawater applied to the piston 30 is very high.

Therefore, the velocity of the propulsion system is gradually increased by the introduction of the seawater at the initial time. When the velocity is equal to or higher than a predetermined velocity, the outer cover 40 closes the seawater discharge holes 20, such that the velocity of the propulsion system may be decreased. When the velocity is equal to or lower than the predetermined velocity, the outer cover 40 opens the seawater discharge holes 20, such that the velocity of the propulsion system may be increased.

When the process is repeated, the propulsion system may consequently have a constant velocity.

The predetermined velocity may be designated in advance without limitation. In this case, the desired velocity may be determined by adjusting the positions of the inner blocking part 60 and the outer blocking part 70.

According to the present invention, it is possible to control the velocity of the propulsion system by increasing the amount of seawater when the velocity of the propulsion system is low and decreasing the amount of seawater when the velocity of the propulsion system is high, thereby implementing a uniform motion of the propulsion system.

While the present invention has been described with reference to the embodiment illustrated in the drawings, the embodiment is described just for illustration, and those skilled in the art to which the present invention pertains will understand that various modifications of the embodiment and any other embodiment equivalent thereto are available.

Accordingly, the true protection scope of the present invention should be determined by the technical spirit of the appended claims.

| DESCRIPTION OF REFERENCE NUMERALS | |
|---|---|
| 10: | Seawater intake pipe |
| 12: | First intake pipe |
| 14: | Second intake pipe |
| 20: | Seawater discharge hole |
| 30: | Piston |
| 32: | Piston rod |
| 33: | Gear |
| 34: | First link |
| 35: | Second link |
| 36: | Third link |
| 40: | Outer cover |
| 50: | Elastic member |
| 60: | Inner blocking part |
| 70: | Outer blocking part |

What is claimed is:

1. An underwater vehicle comprising a seawater flow control device configured to control the propulsion system of the underwater vehicle, the seawater flow control device comprising:

a seawater intake pipe;

a plurality of seawater discharge holes formed through the seawater intake pipe so that seawater is discharged through the plurality of seawater discharge holes;

a piston connected to an end of the seawater intake pipe by means of an elastic member; and an outer cover connected to the piston and configured to open or close the seawater discharge holes, wherein the outer cover opens or closes the seawater discharge holes as the piston is moved by pressure of the seawater, such that a seawater flow rate is adjusted, and a rack connected to one side of the piston; and a gear configured to engage with the rack, wherein the gear is connected to the outer cover, wherein the piston and the rack are rectilinearly moved by the pressure of the seawater, and wherein the gear is rotated by the rectilinear motion of the rack, such that the outer cover is moved.

2. The seawater flow control device of claim 1, wherein the seawater intake pipe comprises a first intake pipe and a second intake pipe, and a diameter of the first intake pipe is smaller than a diameter of the second intake pipe.

3. The seawater flow control device of claim 2, wherein the seawater discharge holes are formed through the first intake pipe, and the piston is connected to an end of the first intake pipe by means of the elastic member.

4. The seawater flow control device of claim 2, comprising:

an inner blocking part provided in the first intake pipe, wherein the inner blocking part prevents the piston from moving toward a front end of the first intake pipe.

5. The seawater flow control device of claim 2, comprising:

an outer blocking part provided on a surface of the first intake pipe, wherein the outer blocking part prevents the outer cover from moving toward a front end of the first intake pipe.

6. The seawater flow control device of claim 1 further comprising:

a first link having one side fixedly connected to the gear;

a second link having one side coupled to an other side of the first link; and a third link having one side coupled to an other side of the second link, wherein an other side of the third link is connected to the outer cover.

7. The seawater flow control device of claim 6, wherein the other side of the first link and one side of the second link are hingedly coupled to each other.

8. The seawater flow control device of claim 1, wherein the elastic member is an elastic spring.

* * * * *